United States Patent [19]

Fromm

[11] Patent Number: 4,951,170

[45] Date of Patent: Aug. 21, 1990

[54] METHOD FOR PROTECTING AN ELECTRIC OBJECT TO BE PROTECTED

[75] Inventor: Wilhelm Fromm, Untersiggenthal, Switzerland

[73] Assignee: Asea Brown Boveri Ltd., Baden, Switzerland

[21] Appl. No.: 365,770

[22] Filed: Jun. 14, 1989

[30] Foreign Application Priority Data

Jun. 28, 1988 [CH] Switzerland ............... 2459/88

[51] Int. Cl.$^5$ ................................. H02H 3/08
[52] U.S. Cl. ........................... 361/87; 361/93; 361/97; 364/483
[58] Field of Search ............ 361/63, 68, 67, 93–97; 364/483, 482

[56] References Cited

U.S. PATENT DOCUMENTS 4,672,501 6/1987 Bilac et al. ..................... 361/96
4,722,059 1/1988 Engel et al. .................... 361/96

FOREIGN PATENT DOCUMENTS 2601524 7/1986 France .
2047995 12/1980 United Kingdom ............ 361/96

OTHER PUBLICATIONS

"Digital Differential Protection of a Generating Unit", Hope et al., IEEE Transactions, vol. PAS-96, No. 2, Mar./Apr. 1977.

"A Current Differential Relay for Use with Digital Communication Systems: Its Design and Field Experience", Stranne et al., GEC Measurements, 13th Annual Western Protective Relay Conference, WSU, Spokane, Washington, Oct. 21–23, 1986.

"Crosscorrelation Technique for Differential Protection Schemes with a Digital Computer", Proc. IEE, vol. 123, No. 2, Feb. 1976.

Primary Examiner—Todd E. DeBoer
Attorney, Agent, or Firm—Burns, Doane, Swecker & Mathis

[57] ABSTRACT

So that internal faults (7) on high-voltage lines (4), generators (5), transformers (6) and other objects to be protected are more reliably detected even with saturated current transformers (3,8) and a tripping of protective measures such as, for example, an opening of switches (2,9) is reliably prevented in the case of external faults and short circuits (10), alternating current measurement signals ($I_1'$, $I_2'$), which are proportional to the alternating currents ($I_1$, $I_2$) flowing into the object to be protected, are detected by means of the current transformers (3,8). The alternating current measurement signals are then supplied via a low-pass filter (12), a transformer (13), a channel selection device (14), an analog/digital converter (15) to a microcomputer (16) for analysis. In the case of a fault, the microcomputer (16) provides a protective tripping signal (F=1) to switches (2,9) which open and thus isolate the object to be protected (4–6) from high-voltage lines (1,11). The protective tripping occurs in dependence on a difference current $I = |I_1' + I_2'|$ and a holding current $$I_H = \sqrt{|I_1'| \cdot |I_2'| \cdot \cos(I_1', -I_2')}$$

for $\cos(I_1', -I_2') > 0$; $I_H$ is otherwise said to be equal to 0. The protective tripping occurs in accordance with a bent $\Delta I/I_H$ characteristic, a conditional tripping range being additionally provided for large $\Delta I$ and $I_H$ values. An unwanted protective tripping, which, for example, can originate from a switch-on current surge during the switch-on of a parallel transformer, can be prevented in dependence on an external tripping inhibit signal (V), among other things.

9 Claims, 2 Drawing Sheets

METHOD FOR PROTECTING AN ELECTRIC OBJECT TO BE PROTECTED

BACKGROUND OF THE INVENTION

FIELD OF THE INVENTION

The invention is based on a method for protecting an at least single-phase electric object to be protected against overcurrents in accordance with the preamble of claim 1.

DISCUSSION OF BACKGROUND

The preamble of the invention relates to a prior art which is known from "G. S. Hope, P. K. Dash, O. P. Malik: Digital Differential Protection of a Generating Unit, Scheme and Real-Time Test Results", IEEE Transactions on Power Apparatus and Systems, Vol. PAS-96, no. 2, Mar./Apr. 1977, page 502–509. In this document, the differential protection of a three-phase synchronous generator is carried out by means of a hybrid computer, the alternating current per phase being detected by means of current transformers in front of and following the generator. For each period of oscillation of the line-frequency current, 16 samples are taken for each alternating current phase and from this the fundamental-frequency components of the respective alternating current are calculated by means of Fourier analysis. For the purpose of protection tripping, the amounts in each case of the difference and sum current of the alternating currents flowing to and from the object to be protected are evaluated for internal faults and the square of the respective difference currents and the product of the two real and of the two imaginary parts of the currents flowing to and from the object to be protected are evaluated for external faults. In this connection a non-linear sensitivity factor is used which is greater for large currents than for small ones and assumes negative values for internal faults. In this connection, false tripping can occur with external faults when the current transformer is highly saturated.

From the publication by "G. Stranne, W. S. Kwong, T. H. Lomas: A Current Differential Relay for use with Digital Communication Systems: Its Design and Field Experience, 13th Annual Western Protective Relay Conference, Washington State University, Spokane, Wash., 21–23 Oct. 1986" it is known to provide as tripping characteristic in a difference current/holding current diagram of a current differential relay a horizontal in the region of small holding current values, corresponding to a minimum response current, and a diagonal in an adjoining region of large holding current values. The sum of the currents in the direction of the object to be protected is calculated as difference current by means of microprocessor and half the sum of the amounts of the individual currents is calculated as holding current. This tripping characteristic can also lead to false tripping in the case of current transformer saturation.

SUMMARY OF THE INVENTION

The invention achieves the object of specifying an improved method for protecting an at least single-phase electric object to be protected against overcurrents which trips a protective measure in the case of internal faults with respect to the object to be protected, even when current transformers are saturated, and does not trip any protective measure with external faults, even when current transformers are saturated.

An advantage of the invention consists in the fact that fewer trips occur and virtually all types of faults are detected. In already existing protective devices using a computer, the method can be applied without problems by exchanging programs. No special measures for controlling the saturation of current transformers are required. Due to the special tripping characteristic, internal short circuits are detected with high reliability even with single-ended feeding.

According to an advantageous development of the invention, switch-on current surges can be detected without internal faults so that no false protective trips occur. This provides high stability in the case of external short circuits and unequal current transformer saturation.

A false protective tripping with switch-on current surges is prevented by comparing an even-order harmonic, particularly the second harmonic, with the fundamental-frequency oscillation. Neither difference nor holding currents need to be calculated for the second harmonic. Protective tripping occurs with switch-on currents and simultaneous short-circuit in the object to be protected.

BRIEF DESCRIPTION OF THE DRAWINGS

In the text which follows, the invention is explained with reference to illustrative embodiments, in which.

DESCRIPTION OF THE PREFERRED EMBODIMENTS

Figure 1:
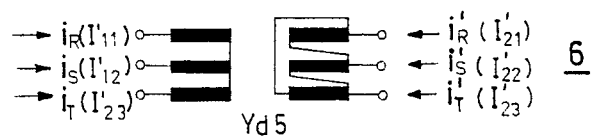
FIG. 1 shows a circuit diagram of an electric protective device comprising three alternative objects to be protected having two inputs each, and a microcomputer for evaluating current measurement signals.

In FIG. 1, 1 designates a first three-phase high-voltage line which is electrically connected via a first electric switch 2 and a first current detector or current transformer 3 per alternating current phase to a three-phase object to be protected, that is to say a line 4 to be protected or a generator 5 to be protected or a transformer 6 to be protected, in star/delta or Yd5 circuit, a second current transformer 8 and a second electric switch 9 to a second three-phase high-voltage line 11. Currents flowing towards the object to be protected are designated by $i_1$ and $i_2$, respectively. The alternating current measurement signals proportional to these currents at the measurement signal outputs of the current transformers 3 and 8 are designated by $I_1'$ and $I_2'$, respectively. 7 Indicates an internal fault or short circuit with respect to the object to be protected 4 or 5 or 6 and 10 indicates an external fault.

The two alternating-current measurement signals $I_1'$ and $I_2'$ are supplied to an analog low-pass filter 12 which blocks frequencies above half the sampling frequency $r.f_N/2$, r being the sampling rate and $f_N$ being the line frequency. The sampling frequency is 300 Hz with a sampling rate r=12 and a line frequency $f_N=50$ Hz.

On the output side, the low-pass filter 12 is connected via a transformer 13 to a multiplexer or to a channel selection device 14 which supplies the alternating-current measurement signals, which are filtered and, if necessary, stepped down in a ratio of 1:8 in the transformer 13, successively in time at the sampling rate r=12 via an analog/digital converter 15 to a microcomputer 16.

Figure 5:
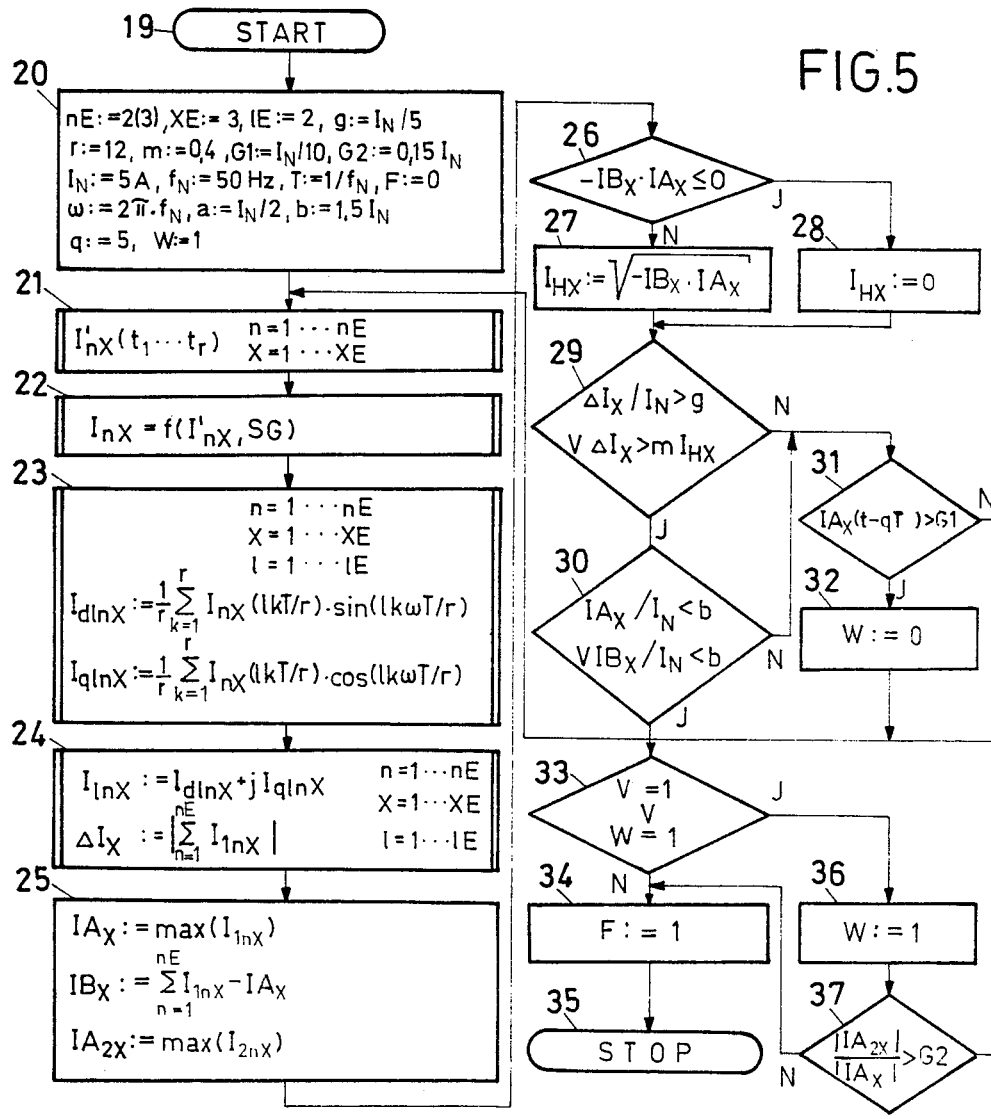
FIG. 5 shows a simplified flow chart for evaluating the signals supplied to the microcomputer in accordance with FIG. 1.

The microcomputer 16 is additionally supplied with a tripping prevention signal V, for example from a second transformer to be protected, not shown, which is used for preventing the tripping of a protective measure in the case of V=1. The conditions for the tripping of the protective measure specified in the flow chart of FIG. 5 are checked by means of the microcomputer 16. In the case of a fault, a protective tripping signal F=1 supplied to the switches 2 and 9 which causes them to open so that the object to be protected 4 or 5 or 6 becomes currentless or is disconnected from the high-voltage lines 1 and 11.

Figure 2:
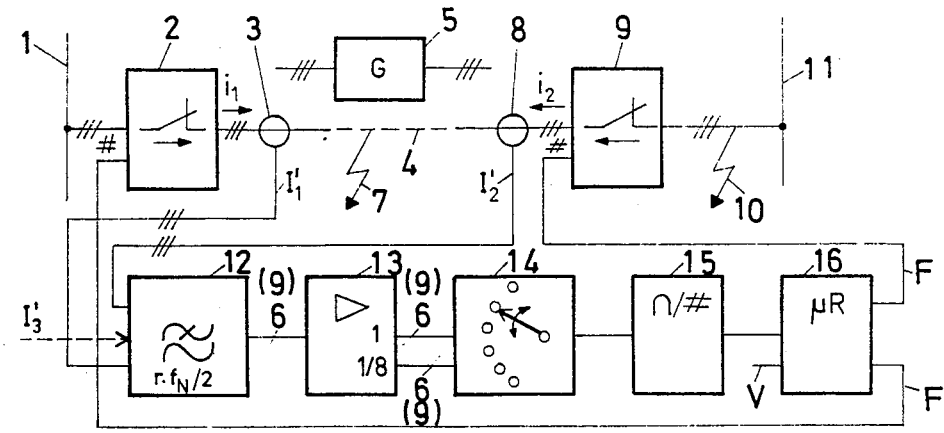
FIG. 2 shows an object to be protected, having three inputs.
Figure 2:
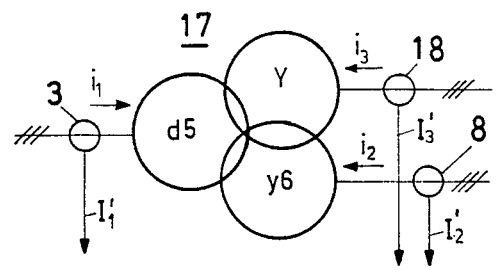

Instead of an object to be protected 4–6, having 2.3 connections, an object to be protected having 3.3 connections can also be provided such as, for example, the three-winding transformer 17 shown in FIG. 2 in YY6d5 circuit with three three-phase alternating currents $i_1$–$i_3$ the signs of which must be rated in the direction of the object to be protected in accordance with the arrows drawn. Alternating-current measurement signals $I_1'$–$I_3'$, which are proportional to these alternating currents $i_1$–$i_3$ are obtained by means of a current transformer 3, 8 and 18 per alternating current phase and supplied via the low-pass filter 12, the transformer 13, the channel selection device 14, the analog/digital converter 15 to the microcomputer 16 according to FIG. 1 for further evaluation.

Figure 3:
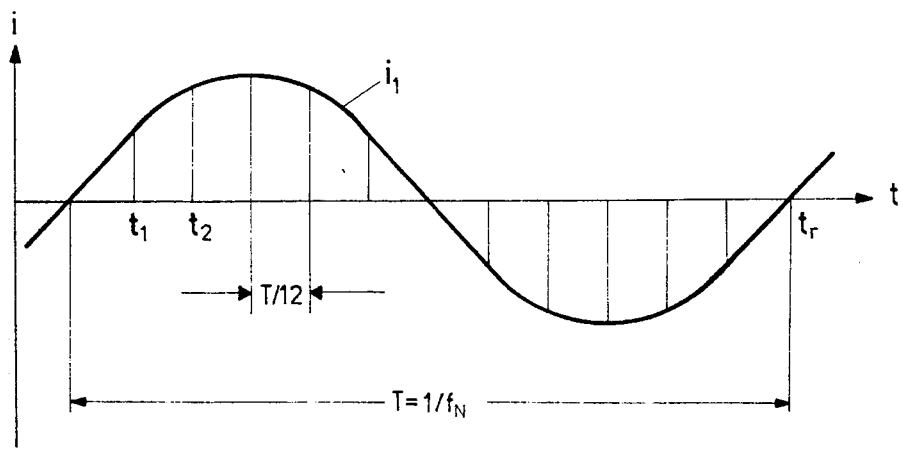
FIG. 3 shows a current/time diagram of a current input signal of the object to be protected according to FIG. 1 and 2, having twelve current sampling values.

In FIG. 3, the variation of the nominalfrequency alternating current $i_1$ according to FIG. 1 is plotted against time t by way of example. T designates the duration of the period of $i_1$, $t_1$, $t_2$ ... $t_r$ designate times for each alternating-current period T in which the filtered and, if necessary, amplitude-modified alternating-current measurement signals $I_1'$ and $I_2'$ can be sampled or detected for evaluation in the channel selection device 14. Thus, twelve modified alternating-current measurement signals per alternating-current period T are made available to the microcomputer 16 for evaluation in the time interval of T/12.

Figure 4:
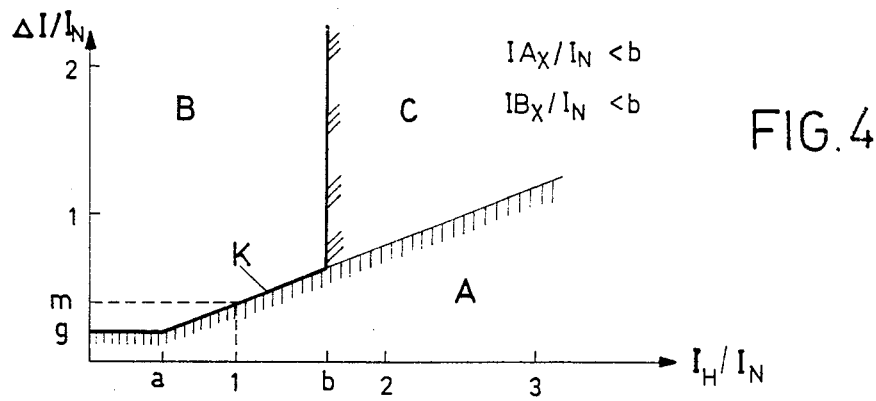
FIG. 4 shows a tripping characteristic for differential protection with a protective device according to FIG. 1.

FIG. 4 shows the tripping characteristic K used for the differential protection. The ratio $\Delta I/I_N$ between difference current $\Delta I$ and nominal current $I_N$ is plotted along the ordinate and the ratio $I_H/I_N$ between holding current $I_H$ and nominal current $I_N$ is plotted along the abscissa. The tripping characteristic K extends in parallel with the abscissa for a range of values of $I_H/I_N$ from 0 up to a predeterminable value a with a predeterminable basic setting or a predeterminable ordinate value $\Delta I/I_N$ of g, $g \cdot I_N$ being a predeterminable first limit value which is preferably within the range from $0.05 I_N$–$0.5 I_N$, at $0.3 \cdot I_N$ in the case of a transformer. $a \cdot I_N$ is a predeterminable second limit value which is preferably within the range from $0.2 I_N$–$0.5 I_N$, particularly at $0.3 I_N$. After that, the tripping characteristic K extends for greater values of $I_H/I_N$ along a straight line having a predeterminable response ratio or a predeterminable slope m in accordance with a third limit value, preferably within the range from 0.05–1 and particularly within the range of values from 0.25–0.5.

No protective tripping occurs in a region designated by A below the tripping characteristic K thus defined. In a region designated by B above the thus defined tripping characteristic K, a protective tripping always occurs for values of $I_H/I_N < b$, b being a predeterminable limit operating current, corresponding to a fourth limit value $b \cdot I_N$ which is preferably within the range of values from $0.5 I_N$–$10 I_N$, particularly within the range of values from $I_N$–$2 I_N$. The limit operating current b must be greater than the highest possible operating current of, for example the generator 5 in order to effect a reliable disconnection in the case of internal short circuits 7 with currents flowing through. If strong and unequal current transformer saturation is expected, b must be selected to be as small as possible. In a range designated by C, protective tripping only occurs for values of $I_H/I_N > b$ above the tripping characteristic K when a current amplitude ratio $IA_x/I_N < b$ or $IB_x/I_N < b$, where $IA_x$ and $IB_x$ are calculated first and second alternating-current signals which will be explained in greater detail with reference to the flow chart of FIG. 5 in the text which follows.

After a program start 19, initial conditions are set in an operation block 20. nE designates the number of inputs n=1,2 ... nE of the object to be protected, where nE=2 in the case of FIG. 1 and nE=3 in the case of FIG. 3. XE designates the number of alternating-voltage phases X=1,2,3, ... ,XE, where X=1,2,3 corresponds to phases R,S,T, compare the transformer 6 in FIG. 1. In the transformer in star/delta circuit shown there, the star-side currents are designated by $i_R$, $i_S$, $i_T$ and the alternating-current measurement signals derived from these by means of current transformers 3 are designated by $I_{11}'$, $I_{12}'$ and $I_{13}'$. The star-side currents are designated by $i_R'$, $i_S'$, $i_T'$ and the alternating-current measurement signals derived from these by means of current transformers 8 are designated by $I_{21}'$, $I_{22}'$ and $I_{23}'$. lE designates the number of part oscillations l=1 ... lE to be calculated by means of Fourier analysis, l=1 being the fundamental oscillation. G1 designates a minimum current limit value, G2 designates a harmonics limit value and $\omega$ designates the angular frequency.

Alternating-current measurement signals $I_{nx}'$ are entered into the microcomputer 16 for n=1 ... nE and X=1 ... XE in a first subprogram 21, not given in greater detail, and stored for the sampling times t1,t2 ... tr of a period T, compare FIG. 3.

In a subsequent second subprogram 22 for switching group amplitude adaptation, required switching group amplitude adaptations are carried out for the case where the object to be protected is a transformer, where $I_{nx}$ designates an amplitude-adapted alternating-current measurement signal and SG designates the respective switching group. $I_{nx}$ is a function of the alternating current measurement signals $I'_{nx}$ and the respective switching group SG.

The following holds true for the switching group adaptation for a two-winding transformer of switching group Yd5 according to FIG. 1:

$$I_{11} = (I'_{12} - I'_{11})/\sqrt{3},$$

$$I_{12} = (I'_{13} - I'_{12})/\sqrt{3},$$

-continued $$I_{13} = (\Gamma_{11} - \Gamma_{13})/\sqrt{3},$$

$I_{21}=I_{21}'$, $I_{22}=I_{22}'$ and $I_{23}=I_{23}'$. In addition, the amplitudes of the alternating current measurement signals can be adapted.

The following holds true, for example for amplitude adaptation, for a three-winding transformer 17 of switching group YY6d5 according to FIG. 2:

$$I_{nx} = \Gamma_{nx} \cdot U_{Nn} \cdot I_{CTn} \cdot \sqrt{3}/P_N,$$

where $U_{Nn}$ is the respective nominal voltage, $I_{CTn}$ is the respective current transformer nominal current and $P_N$ is the common reference power.

The comparison currents of the secondary and tertiary side are recalculated to the primary side. If necessary, the recalculation can be performed by means of empirical values.

In a subprogram 23, the alternating-current measurement signals $I_{nx}$, which have been amplitude-adapted if necessary, are subjected to a Fourier analysis, the real part $I_{d1nx}$ and the imaginary part $I_{q1nx}$ of the respective part oscillation $I_{1nx}$ being calculated for $l=1 \ldots lE$, $X=1 \ldots XE$ and $n=1 \ldots nE$. Naturally, so-called Haar functions, known per se, can also be used for analysis, for example, instead of the Fourier analysis.

In the subsequent subprogram 24, the part oscillations $I_{1nx}=I_{d1nx}+j \cdot I_{q1nx}$ are calculated for $l=1 \ldots lE$, $X=1 \ldots XE$ and $n=1 \ldots nE$, with $$j = \sqrt{-1},$$

and the difference current $$\Delta I_x = \left| \sum_{n=1}^{nE} I_{1nx} \right|$$

for $l=1$, that is to say for the fundamental oscillation.

In an operation block 25, a first alternating current signal $IA_x=\max(I_{1nx})$ is calculated as maximum value signal and a second alternating-current signal $$IB_x = \sum_{n=1}^{nE} I_{1nx} - IA_x$$

is calculated as difference signal referred to the fundamental oscillation. Furthermore, a harmonic alternating current signal $IA_{2x}=\max(I_{2nx})$ is calculated as maximum value signal of the first harmonic.

To calculate the holding current $I_{Hx}$, it is subsequently checked in a branch 26 whether $\cos(IA_x;-IB_x)=IA_x\cdot(-IB_x)/(|IA_x|\cdot|(-IB_x)|)$ or whether $-IB_x \cdot IA_x \leq 0$. If so, $I_{Hx}=0$ is set in an operational block 28, otherwise $$I_{Hx} = \sqrt{-IB_x \cdot IA_x}$$

is calculated in an operation block 27. To avoid taking the square root, $I_{Hx}^2$ can also be used for calculating, in which case the subsequent relations in which $I_{Hx}^2$ occurs must be appropriately adapted. The holding current $$I_H = \sqrt{|IA| \cdot |IB| \cdot \cos(IA; -IB)}$$

for $\cos(IA,-IB) \geq 0$ and $I_H=0$ for $\cos(IA;-IB)<0$.

The tripping conditions are tested in the subsequent branches 29 and 30. In branch 29, it is compared whether $\Delta I_x/I_N>g$ or $\Delta I_x>mI_{Hx}$. If yes, it is compared in branch 30 whether $IB_x/I_N<b$. If no, a comparison is made after the two branches 29 and 30 in a branch 31 whether $IA_x(t-qT)>G1=I_N/10$, that is to say whether the first calculated alternating-current signal has exceeded a predeterminable minimum current limit value G1 before a predeterminable time period of preferably $q=5$ nominal-frequency periods T. If yes, a switch W in an operational block 32 is set to the value 0 and the program jumps to the input of 21; in no, it jumps immediately to the input of 21. G1 is preferably selected to be $=I_N/100$, that is to say as small as possible. q is selected within a range of values from 1 to 10.

If the result of the branch 30 is "yes", a comparison is made in a branch 33 whether an external tripping inhibit signal V or the switch W have the logical value 1. If yes, the switch W is set to the value 1 in an operational block 36 and subsequently a comparison is made in a branch 37 whether $|IA_{2x}|/|IA_x|>G2$, that is to say whether the amplitude ratio of the maximum values per input n and phase X between first harmonic and fundamental exceeds a predeterminable harmonic limit value $G2=0.15I_N$. If yes, the program jumps to the input of 21, if no and also if the results of branch 33 is "no", the protective tripping signal F is set to a logical 1 in an operational block 34 and the progam then goes to program end 35. G2 is preferably selected within a range of from $0.1I_N$–$0.2I_N$. Instead of the amplitude of the first harmonic $I_{2nX}$, the amplitude of another even-numbered harmonic can also be used for the comparison. The comparison in the branch 33 makes it possible to prevent, for example, switch-on current surges due to the connection of parallel-connected transformers (not shown) from leading to an unwanted protective tripping.

The special calculation of the holding current $I_H$ and the range C within which a conditional protective tripping occurs are of particular importance to the present invention.

The method according to the invention covers two- and three-phase internal short circuits 7, winding short circuits and, in the case of low-impedance star-point grounding, also stator short circuits of generators. The protective tripping, that is to say the delivery of the tripping command for opening switches 2 and 9 according to FIG. 1, without relay, occurs within 20 ms in the case of alternating currents $i_n<2I_N$ and within 40 ms in the case of $i_n<2I_N$.

If the current transformers 3,8,18 are not equally saturated and an external short circuit 10 exists, the holding current $I_H$ has a magnitude as required. The maximum advance of the 50-Hz current component due to a saturation of the current transformer is $<90°$, typically up to approximately 60°, that is to say, $\cos(IA_x,-IB_x)>0.5$ and thus, generally, $I_H>I_N$. The risk of inadequate operation with a unilaterally fed internal short circuit 7 and load current component flowing through the object to be protected 4–6,17 is avoided by the fact that tripping occurs with a small alternating current ($IA_x/I_N<b$ or $IB_x/I_N<b$) on one side and simultaneously high real-part component $I_{d1nx}$. Internal short circuits 7 are sufficiently quickly detected in the case of current transformer saturation. In the case of internal short circuits 7 and higher difference currents ($\Delta I > I_N$), the tripping region B or C is typically reached within 5 ms.

The method according to the invention requires little computing effort in the detection of switch-on current surges in transformers since the amplitude ratio between second and first harmonic only needs to be calculated for the phase having the maximum alternating-current amplitude. Disconnection is ensured even if a one- or multi-pole short circuit exists in addition to a switch-on current surge.

What is claimed as new and desired to be secured by latest patent of the United States is:

1. Method for protecting an at least single-phase electric object to be protected (4-6,17) against overcurrents,
    (a) in which for each alternating-current phase, in dependence on at least one limit-value transgression of a difference current ($\Delta I$) between at least one first alternating current ($i_1$) flowing into the object to be protected and at least one second alternating current ($-i_2, -i_3$) flowing out of the object to be protected, or, in dependence on the sum of all currents of the object to be protected,
    (b) at least one protective tripping signal (F=1) is supplied to at least one protective device (2,9), wherein
    (c) the protective tripping signal is generated when the difference current ($\Delta I$) is gretaer than a predetminable first limit value ($g.I_N$) and
    (d) at the same time, a holding current ($I_H$), which holds back the tripping, is less than a predeterminable second limit vale ($a.I_N$),
    (e) the following holding true for the holding current:

$$I_H = \sqrt{|IA| \cdot |IB| \cdot \cos(IA; - IB)}$$

for $\cos(IA, -IB) \geq 0$ and $I_H = 0$ for $\cos(IA; -IB) < 0$, where IA and IB are first and second alternating-current signals which are allocated to the alternating current ($i_1$) flowing into the object to the protected or to an alternating current ($-i_2, -i_3$) flowing out of the object to be protected.

2. Method as claimed in claim 1, wherein
    (a) the first limit value ($g.I_N$) is within the range from 5%-50% of the nominal current ($I_N$) and
    (b) the second limit value ($a.I_N$) is within the range from 10%-50% of the nominal current ($I_N$).

3. Method as claimed in claim 1, wherein a protective tripping signal (F=1) is generated
    (a) when the holding current ($I_H$) $\geq$ the second limit value ($a.I_N$) and
    (b) when the difference current ($\Delta I$) > $m.I_H$, where m designates a predeterminable third limit value.

4. Method as claimed in claim 3, wherein
    (a) the third limit value (m) is within the range between 0.05 and 1.

5. Method as claimed in claim 3, wherein a protective tripping signal (F=1) is generated when the first alternating-current signal (IA) or the second alternating-current signal (IB) is less than a predeterminable fourth limit value ($b.I_N$).

6. Method as claimed in claim 3, wherein a protective tripping signal (F=1) is generated when the holding current ($I_H$) is less than a fourth limit value ($b.I_N$).

7. A method as claimed in claim 5, wherein
    (a) the fourth limit value ($b.I_N$) is within the range between 0.5-10 times the nominal current ($I_N$).

8. Method as claimed in claim 1, wherein
    (a) in dependence on the at least one alternating current ($i_1$) flowing into the object to be protected and in dependence on the at least one alternating current ($-i_2, -i_3$) flowing out of the object to be protected, the first and second alternating-current signals (IA,IB) are formed from alternating-current measuring signals ($I_1'-I_3', I_{nX}'$) proportional to these alternating currents,
    (b) which, after low-pass filtering (12) and
    (c) if necessary, amplitude matching (22), in dependence on a switching group (SG),
    (d) are subjected to a Fourier analysis (23),
    (e) from which at least the line-frequency mutually orthogonal oscillation components ($I_{d1nX}, I_{q1nX}$) are selected in accordance with:

$$I_{d1nX} = \frac{1}{r} \sum_{k=1}^{r} I_{nX}(1kT/r) \cdot \sin(1K\omega T/r)$$

$$I_{q1nX} = \frac{1}{r} \sum_{k=1}^{r} I_{nX}(1kT/r) \cdot \cos(1k\omega T/r)$$

and
    (f) are used for further calculation of the difference current $\Delta I_X$, in accordance with $$\Delta I_x = \left| \sum_{n=1}^{nE} I_{1nX} \right| \text{with}$$

$$I_{1nX} = I_{d1nX} + j \cdot I_{q1nX}$$

(g) the first alternating-current signal (IA) is calculated in accordance with
    $IA_x = \max(I_{nX})$ for $nE \geq 2$ and
    (h) the second alternating-current signal (IB) is calculated in accordance with $$IB_x \sum_{n=1}^{nE} I_{nX} - IA_x \text{ for } nE \geq 2$$

with n=variable for the inputs of the object to be protected, nE=number of inputs, X=variable for the alternating-current phase, $$j = \sqrt{-1},$$

r=sampling rate.

9. Method as claimed in claim 8, wherein a protective tripping is prevented
    (a) when the amplitude ratio between an even-numbered harmonic and the fundamental-frequency component in one alternating-voltage phase is greater than a predeterminable six limit value (G2), the amplitude ratio only being calculated for the phase with the maximum alternating-current amplitude,
    (b) when an external tripping inhibit signal (VS=1) is present and
    (c) in particular, that the sixth limit value is within the range from $0.1I_N$-$0.2I_N$.

* * * * *